(12) United States Patent
Brewer et al.

(10) Patent No.: US 8,738,058 B2
(45) Date of Patent: May 27, 2014

(54) HIGH-PRIORITY COMMUNICATIONS SESSIONS WITHIN A WIRELESS COMMUNICATIONS SYSTEM

(75) Inventors: Beth A. Brewer, Canyonlake, TX (US); Hamsini Bhaskaran, San Diego, CA (US); Ashutosh Aggarwal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 149 days.

(21) Appl. No.: 12/750,218

(22) Filed: Mar. 30, 2010

(65) Prior Publication Data

US 2010/0255826 A1 Oct. 7, 2010

Related U.S. Application Data

(63) Continuation-in-part of application No. 12/728,489, filed on Mar. 22, 2010, and a continuation-in-part of application No. 12/502,036, filed on Jul. 13, 2009.

(60) Provisional application No. 61/167,077, filed on Apr. 6, 2009.

(51) Int. Cl.
*H04W 4/00* (2009.01)
*H04W 72/00* (2009.01)
*H04W 24/00* (2009.01)

(52) U.S. Cl.
USPC ........ 455/518; 455/422.1; 455/450; 455/453; 455/456.2; 455/464; 455/451; 455/509; 455/510

(58) Field of Classification Search
USPC .............. 455/422, 450–453, 456.2, 464, 509, 455/510; 370/395.4, 332
See application file for complete search history.

(56) References Cited

U.S. PATENT DOCUMENTS 4,771,422 A 9/1988 Hauer
4,771,442 A 9/1988 Waddington
(Continued)

FOREIGN PATENT DOCUMENTS

CN 1832414 A 9/2006
CN 101009579 A 8/2007
(Continued)

OTHER PUBLICATIONS

International Search Report and Written Opinion—PCT/US2010/028538, International Search Authority—European Patent Office—Jun. 24, 2010.

(Continued)

*Primary Examiner* — Bobbak Safaipour
(74) *Attorney, Agent, or Firm* — Raphael Freiwirth

(57) ABSTRACT

In an embodiment, a call originator sends, to an application server, a request to initiate a given communication session with at least one call target, the received request configured to indicate to the application server that the given communication session is associated with a high-priority. The application server configures a call announcement to force the at least one call target to accept the given communication session, and transmits the configured call announcement to the at least one call target. The at least one call target receives the call announcement, and determines that the call announcement is configured to force the given access terminal to accept the given communication session. Responsive to the determination, the at least one call target transmits an acknowledgment to the call announcement that indicates that the at least one call target has accepted the given communication session.

33 Claims, 6 Drawing Sheets

(56) References Cited

U.S. PATENT DOCUMENTS

| | | | |
|---|---|---|---|
| 5,521,925 | A | 5/1996 | Merakos et al. |
| 6,067,457 | A | 5/2000 | Erickson et al. |
| 6,167,252 | A | 12/2000 | Cohen |
| 6,243,580 | B1 | 6/2001 | Garner |
| 6,275,575 | B1 | 8/2001 | Wu |
| 6,636,482 | B2 | 10/2003 | Cloonan et al. |
| 6,674,713 | B1 | 1/2004 | Berg et al. |
| 6,721,831 | B1 | 4/2004 | Lee |
| 6,725,052 | B1 | 4/2004 | Raith |
| 6,744,732 | B1 | 6/2004 | Pfenning et al. |
| 6,781,963 | B2 | 8/2004 | Crockett et al. |
| 6,970,926 | B1 | 11/2005 | Needham et al. |
| 7,089,016 | B2 | 8/2006 | Dokko |
| 7,093,044 | B2 | 8/2006 | Joy et al. |
| 7,397,774 | B1 | 7/2008 | Holland et al. |
| 7,545,780 | B2 | 6/2009 | Chitrapu |
| 7,616,572 | B2 * | 11/2009 | Elmasry et al. ............... 370/235 |
| 7,689,232 | B1 * | 3/2010 | Beyer, Jr. ..................... 455/457 |
| 7,761,110 | B2 | 7/2010 | Chotai et al. |
| 7,761,515 | B2 | 7/2010 | Denninghoff |
| 7,848,642 | B1 | 12/2010 | Chaudhuri et al. |
| 8,094,618 | B2 | 1/2012 | Yi et al. |
| 8,223,935 | B2 * | 7/2012 | Krishnamoorthy et al. ........................ 379/114.03 |
| 8,422,651 | B2 * | 4/2013 | Krishnamoorthy et al. ........................ 379/114.03 |
| 2003/0078064 | A1 | 4/2003 | Chan |
| 2003/0157935 | A1 * | 8/2003 | Kauhanen .................... 455/436 |
| 2004/0005904 | A1 | 1/2004 | Wolf et al. |
| 2004/0058695 | A1 | 3/2004 | Ji et al. |
| 2004/0077358 | A1 * | 4/2004 | Bennett et al. ................ 455/455 |
| 2004/0125800 | A1 | 7/2004 | Zellner |
| 2004/0142694 | A1 | 7/2004 | Levy et al. |
| 2004/0202178 | A1 | 10/2004 | Okubo |
| 2005/0053206 | A1 * | 3/2005 | Chingon et al. ........... 379/88.19 |
| 2005/0124365 | A1 * | 6/2005 | Balasuriya et al. ........... 455/518 |
| 2006/0120321 | A1 | 6/2006 | Gerkis et al. |
| 2006/0142006 | A1 | 6/2006 | Ryoo |
| 2006/0276213 | A1 | 12/2006 | Gottschalk et al. |
| 2007/0004438 | A1 | 1/2007 | Brusilovsky et al. |
| 2007/0049335 | A1 | 3/2007 | Haitani et al. |
| 2007/0195762 | A1 | 8/2007 | Choi et al. |
| 2007/0197248 | A1 | 8/2007 | Reich et al. |
| 2007/0197249 | A1 | 8/2007 | Ross et al. |
| 2007/0202910 | A1 | 8/2007 | Brewer et al. |
| 2007/0218903 | A1 * | 9/2007 | Grech .......................... 455/436 |
| 2007/0239824 | A1 | 10/2007 | Shaffer et al. |
| 2007/0249381 | A1 | 10/2007 | Forslow |
| 2007/0281723 | A1 | 12/2007 | Chotai et al. |
| 2008/0003942 | A1 | 1/2008 | Namm et al. |
| 2008/0076391 | A1 | 3/2008 | Chen et al. |
| 2008/0081567 | A1 | 4/2008 | Rofougaran |
| 2008/0146203 | A1 * | 6/2008 | Khawand et al. .......... 455/414.1 |
| 2008/0175189 | A1 | 7/2008 | Furrer et al. |
| 2008/0207242 | A1 | 8/2008 | Ekberg |
| 2008/0281971 | A1 | 11/2008 | Leppanen et al. |
| 2008/0298308 | A1 | 12/2008 | Hannu et al. |
| 2009/0061904 | A1 | 3/2009 | Emrich et al. |
| 2009/0080360 | A1 * | 3/2009 | Song .............................. 370/312 |
| 2009/0209196 | A1 | 8/2009 | Haverty |
| 2009/0275281 | A1 | 11/2009 | Rosen |
| 2009/0312045 | A1 | 12/2009 | Miller et al. |
| 2010/0016008 | A1 * | 1/2010 | Brewer et al. ................ 455/518 |
| 2010/0020958 | A1 | 1/2010 | Roberts et al. |
| 2010/0074222 | A1 | 3/2010 | Wu |
| 2010/0248742 | A1 * | 9/2010 | Song et al. ................ 455/456.1 |
| 2010/0248771 | A1 * | 9/2010 | Brewer et al. ................ 455/518 |
| 2011/0026419 | A1 | 2/2011 | Kim et al. |
| 2012/0295617 | A1 * | 11/2012 | Anchan et al. ............. 455/435.1 |
| 2013/0190033 | A1 | 7/2013 | Aggarwal et al. |

FOREIGN PATENT DOCUMENTS

| | | |
|---|---|---|
| CN | 101189810 A | 5/2008 |
| EP | 1193993 A2 | 4/2002 |
| EP | 1681896 A1 | 7/2006 |
| EP | 1871139 A1 | 12/2007 |
| JP | 3050996 A | 3/1991 |
| JP | 6334587 A | 12/1994 |
| JP | 8508373 | 9/1996 |
| JP | 11504782 T | 4/1999 |
| JP | 2000350256 A | 12/2000 |
| JP | 2001103551 A | 4/2001 |
| JP | 2003086233 A | 3/2003 |
| JP | 2003209885 A | 7/2003 |
| JP | 2003298751 A | 10/2003 |
| JP | 2006515135 A | 5/2006 |
| JP | 2007505563 A | 3/2007 |
| JP | 2009302605 A | 12/2009 |
| WO | 9732443 A2 | 9/1997 |
| WO | 0145330 A1 | 6/2001 |
| WO | WO0230010 A1 | 4/2002 |
| WO | 03036801 A2 | 5/2003 |
| WO | 2004075001 A2 | 9/2004 |
| WO | 2005027483 A1 | 3/2005 |
| WO | 2005096658 A1 | 10/2005 |
| WO | 05112488 | 11/2005 |
| WO | WO2006129985 A1 | 12/2006 |
| WO | WO2007098331 | 8/2007 |
| WO | 2008048273 | 4/2008 |
| WO | WO2008091893 A1 | 7/2008 |

OTHER PUBLICATIONS

International Search Report and Written Opinion—PCT/US2011/029383—ISA/EPO—Jun. 7, 2011.

International Search Report, PCT/US2009/050744, International Searching Authority, European Patent Office, Dec. 11, 2009.

Written Opinion, PCT/US2009/050744, International Searching Authority, European Patent Office, Dec. 11, 2009.

International Search Report, PCT/US2010/029820, International Searching Authority, European Patent Office, Jun. 24, 2010.

Written Opinion, PCT/US2010/029820, International Searching Authority, European Patent Office, Jun. 24, 2010.

Open Mobile Alliance (OMA) Ltd: "Push to Talk Over Cellular (PoC)—Architecture Draft Version 2.0", Open Mobile Alliance OMA-AD_PoC-V2_0-20060224-D, Feb. 24, 2006, pp. 1-218, XP-002462873.

* cited by examiner

HIGH-PRIORITY COMMUNICATIONS SESSIONS WITHIN A WIRELESS COMMUNICATIONS SYSTEM

CLAIM OF PRIORITY UNDER 35 U.S.C. §119

The present application for patent claims priority to Provisional Application No. 61/167,077 entitled "EMERGENCY COMMUNICATION SESSIONS WITHIN A WIRELESS COMMUNICATIONS SYSTEM", filed on Apr. 6, 2009, which is incorporated herein by reference in its entirety.

CLAIM OF PRIORITY UNDER 35 U.S.C. §120

The present application is a continuation-in-part of co-pending U.S. Non-Provisional application Ser. No. 12/502,036, entitled "PRIORITIZATION OF GROUP COMMUNICATIONS AT A WIRELESS COMMUNICATION DEVICE" filed on Jul. 13, 2009, and U.S. Non-Provisional application Ser. No. 12/728,489, entitled "SELECTIVELY ALLOCATING DATA CHANNEL RESOURCES TO WIRELESS COMMUNICATION DEVICES WITHIN A WIRELESS COMMUNICATIONS SYSTEM" filed on Mar. 22, 2010, each of which is incorporated herein by reference in its entirety.

BACKGROUND OF THE INVENTION

1. Field of the Invention

Embodiments of the invention relate to high-priority communication sessions within a wireless communications system.

2. Description of the Related Art

Wireless communication systems have developed through various generations, including a first-generation analog wireless phone service (1G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (WCDMA), CDMA2000 (such as CDMA2000 1xEV-DO standards, for example) or TD-SCDMA.

In wireless communication systems, mobile stations, handsets, or access terminals (AT) receive signals from fixed position base stations (also referred to as cell sites or cells) that support communication links or service within particular geographic regions adjacent to or surrounding the base stations. Base stations provide entry points to an access network (AN)/radio access network (RAN), which is generally a packet data network using standard Internet Engineering Task Force (IETF) based protocols that support methods for differentiating traffic based on Quality of Service (QoS) requirements. Therefore, the base stations generally interact with ATs through an over the air interface and with the AN through Internet Protocol (IP) network data packets.

In wireless telecommunication systems, Push-to-talk (PTT) capabilities are becoming popular with service sectors and consumers. PTT can support a "dispatch" voice service that operates over standard commercial wireless infrastructures, such as CDMA, FDMA, TDMA, GSM, etc. In a dispatch model, communication between endpoints (ATs) occurs within virtual groups, wherein the voice of one "talker" is transmitted to one or more "listeners." A single instance of this type of communication is commonly referred to as a dispatch call, or simply a PTT call. A PTT call is an instantiation of a group, which defines the characteristics of a call. A group in essence is defined by a member list and associated information, such as group name or group identification.

Conventionally, data packets within a wireless communication network have been configured to be sent to a single destination or access terminal. A transmission of data to a single destination is referred to as "unicast". As mobile communications have increased, the ability to transmit given data concurrently to multiple access terminals has become more important. Accordingly, protocols have been adopted to support concurrent data transmissions of the same packet or message to multiple destinations or target access terminals. A "broadcast" refers to a transmission of data packets to all destinations or access terminals (e.g., within a given cell, served by a given service provider, etc.), while a "multicast" refers to a transmission of data packets to a given group of destinations or access terminals. In an example, the given group of destinations or "multicast group" may include more than one and less than all of possible destinations or access terminals (e.g., within a given group, served by a given service provider, etc.). However, it is at least possible in certain situations that the multicast group comprises only one access terminal, similar to a unicast, or alternatively that the multicast group comprises all access terminals (e.g., within a given cell, etc.), similar to a broadcast.

In addition to various transmission schemes (e.g., unicast, multicast, broadcast) that may be used, generally, a PTT or PTT over Cellular (PoC) call corresponds to a server mediated communication between two or more identified access terminals, regardless of the various configurations used to conduct the PTT calls. Further, conventionally, a PTT calls are initiated and maintained by a physical interaction at the access terminal (e.g., pressing and holding a key).

SUMMARY

In an embodiment, a call originator sends, to an application server, a request to initiate a given communication session with at least one call target. The received request configured is to indicate to the application server that the given communication session is associated with a high-priority. If necessary, the application server can reduce its load and/or preempt one or more other users or other sessions to support the given communication session. The application server configures a call announcement to force the at least one call target to accept the given communication session, and transmits the configured call announcement to the at least one call target.

The at least one call target receives the call announcement, and determines that the call announcement is configured to force the given access terminal to accept the given communication session. Responsive to the determination, the at least one call target transmits an acknowledgment to the call announcement that indicates that the at least one call target has accepted the given communication session.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
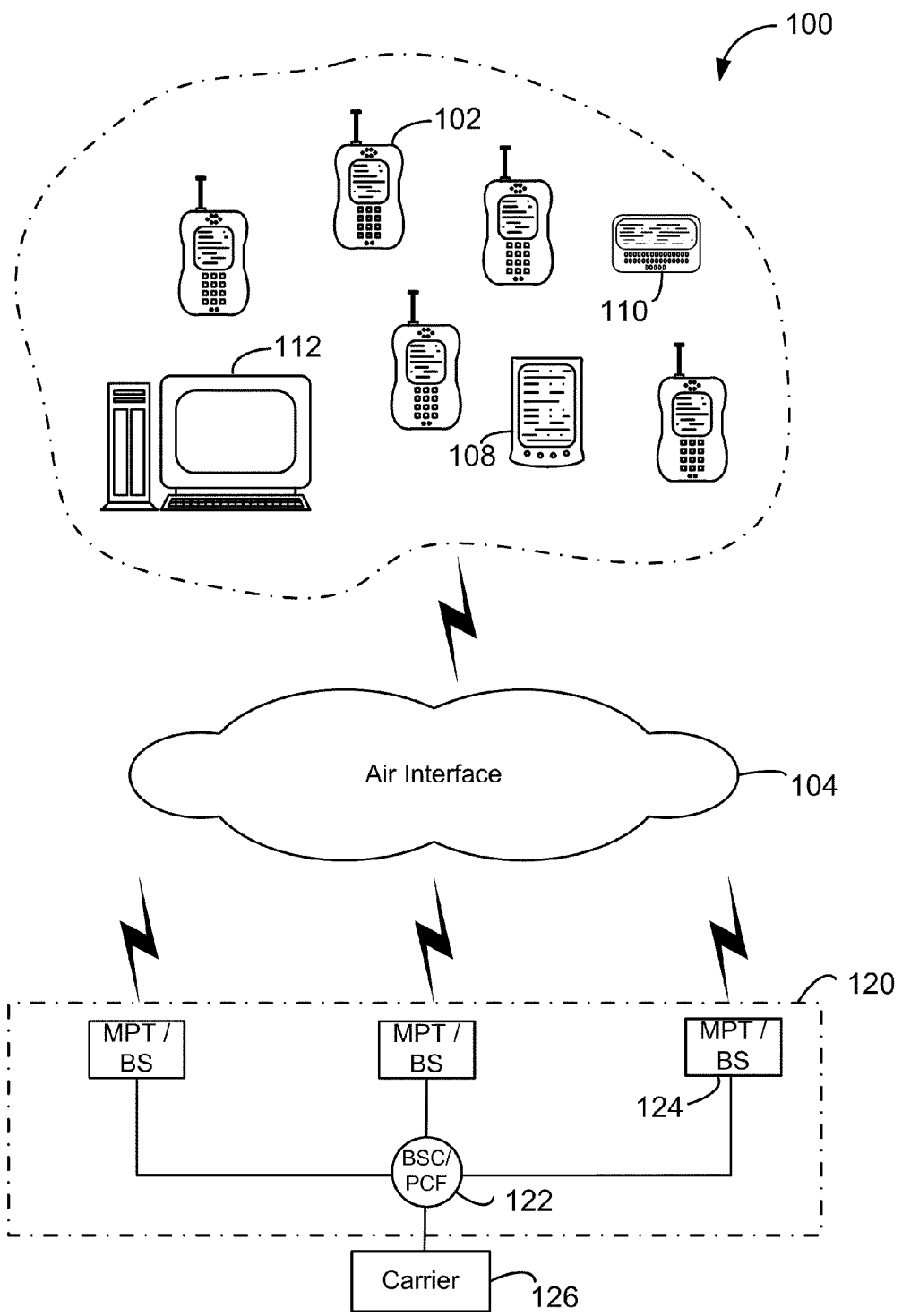
FIG. 1 is a diagram of a wireless network architecture that supports access terminals and access networks in accordance with at least one embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as an access terminal (AT), may be mobile (e.g., wireless) or stationary (e.g., a wired client, such as a dispatch console), and may communicate with one or more HDR base stations, referred to herein as modem pool transceivers (MPTs) or base stations (BS). An access terminal transmits and receives data packets through one or more modem pool transceivers to an HDR base station controller, referred to as a modem pool controller (MPC), base station controller (BSC) and/or packet control function (PCF). Modem pool transceivers and modem pool controllers are parts of a network called an access network. An access network transports data packets between multiple access terminals.

The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link or traffic channel. The communication link through which a modem pool transceiver sends signals to an access terminal is called a forward link or traffic channel. As used herein the term traffic channel can refer to either a forward or reverse traffic channel.

FIG. 1 illustrates a block diagram of one exemplary embodiment of a wireless system 100 in accordance with at least one embodiment of the invention. System 100 can contain access terminals, such as cellular telephone 102, in communication across an air interface 104 with an access network or radio access network (RAN) 120 that can connect the access terminal 102 to network equipment providing data connectivity between a packet switched data network (e.g., an intranet, the Internet, and/or carrier network 126) and the access terminals 102, 108, 110, 112. As shown here, the access terminal can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, telephones, or any combination or sub-combination thereof. Further, as used herein, the terms "access terminal", "wireless device", "client device", "mobile terminal" and variations thereof may be used interchangeably.

Referring back to FIG. 1, the components of the wireless network 100 and interrelation of the elements of the exemplary embodiments of the invention are not limited to the configuration illustrated. System 100 is merely exemplary and can include any system that allows remote access terminals, such as wireless client computing devices 102, 108, 110, 112 to communicate over-the-air between and among each other and/or between and among components connected via the air interface 104 and RAN 120, including, without limitation, carrier network 126, the Internet, and/or other remote servers.

The RAN 120 controls messages (typically sent as data packets) sent to a base station controller/packet control function (BSC/PCF) 122. The BSC/PCF 122 is responsible for signaling, establishing, and tearing down bearer channels (i.e., data channels) between a packet data service node 100 ("PDSN") and the access terminals 102/108/110/112. If link layer encryption is enabled, the BSC/PCF 122 also encrypts the content before forwarding it over the air interface 104. The function of the BSC/PCF 122 is well-known in the art and will not be discussed further for the sake of brevity. The carrier network 126 may communicate with the BSC/PCF 122 by a network, the Internet and/or a public switched telephone network (PSTN). Alternatively, the BSC/PCF 122 may connect directly to the Internet or external network. Typically, the network or Internet connection between the carrier network 126 and the BSC/PCF 122 transfers data, and the PSTN transfers voice information. The BSC/PCF 122 can be connected to multiple base stations (BS) or modem pool transceivers (MPT) 124. In a similar manner to the carrier network, the BSC/PCF 122 is typically connected to the MPT/BS 124 by a network, the Internet and/or PSTN for data transfer and/or voice information. The MPT/BS 124 can broadcast data messages wirelessly to the access terminals, such as cellular telephone 102. The MPT/BS 124, BSC/PCF 122 and other components may form the RAN 120, as is known in the art. However, alternate configurations may also be used and the invention is not limited to the configuration illustrated. For example, in another embodiment the functionality of the BSC/PCF 122 and one or more of the MPT/BS 124 may be collapsed into a single "hybrid" module having the functionality of both the BSC/PCF 122 and the MPT/BS 124.

Figure 2A:
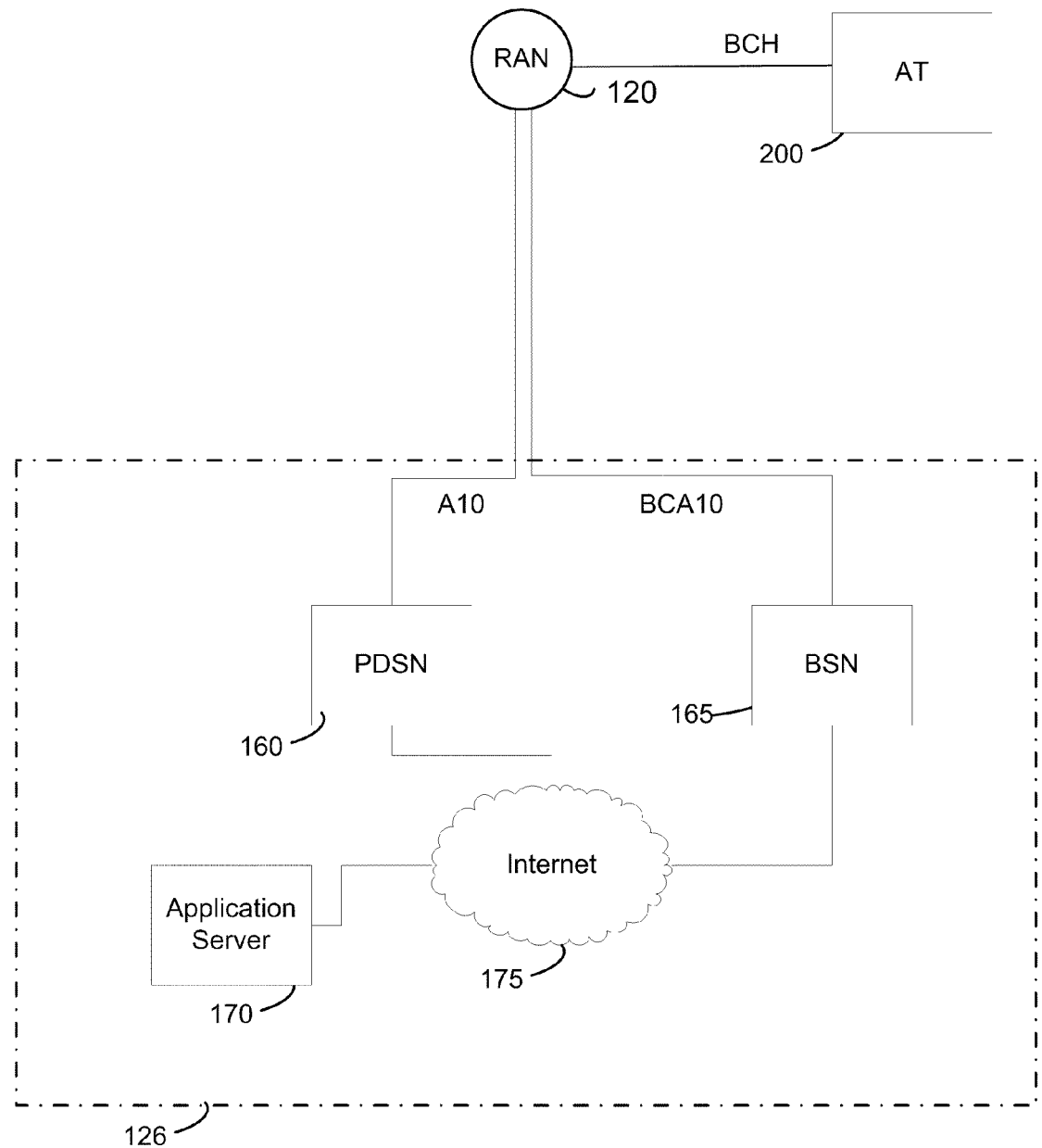
FIG. 2A illustrates the carrier network according to an embodiment of the present invention.

FIG. 2A illustrates the carrier network 126 according to an embodiment of the present invention. In the embodiment of FIG. 2A, the carrier network 126 includes a packet data serving node (PDSN) 160, a broadcast serving node (BSN) 165, an application server 170 and an Internet 175. However, application server 170 and other components may be located outside the carrier network in alternative embodiments. The PDSN 160 provides access to the Internet 175, intranets and/or remote servers (e.g., application server 170) for mobile stations (e.g., access terminals, such as 102, 108, 110, 112 from FIG. 1) utilizing, for example, a cdma2000 Radio Access Network (RAN) (e.g., RAN 120 of FIG. 1). Acting as an access gateway, the PDSN 160 may provide simple IP and mobile IP access, foreign agent support, and packet transport. The PDSN 160 can act as a client for Authentication, Authorization, and Accounting (AAA) servers and other supporting infrastructure and provides mobile stations with a gateway to the IP network as is known in the art. As shown in FIG. 2A, the PDSN 160 may communicate with the RAN 120 (e.g., the BSC/PCF 122) via a conventional A10 connection. The A10 connection is well-known in the art and will not be described further for the sake of brevity.

Referring to FIG. 2A, the broadcast serving node (BSN) 165 may be configured to support multicast and broadcast services. The BSN 165 will be described in greater detail below. The BSN 165 communicates with the RAN 120 (e.g., the BSC/PCF 122) via a broadcast (BC) A10 connection, and with the application server 170 via the Internet 175. The BCA10 connection is used to transfer multicast and/or broadcast messaging. Accordingly, the application server 170 sends unicast messaging to the PDSN 160 via the Internet 175, and sends multicast messaging to the BSN 165 via the Internet 175.

Generally, as will be described in greater detail below, the RAN 120 transmits multicast messages, received from the BSN 165 via the BCA10 connection, over a broadcast channel (BCH) of the air interface 104 to one or more access terminals 200.

Figure 2B:
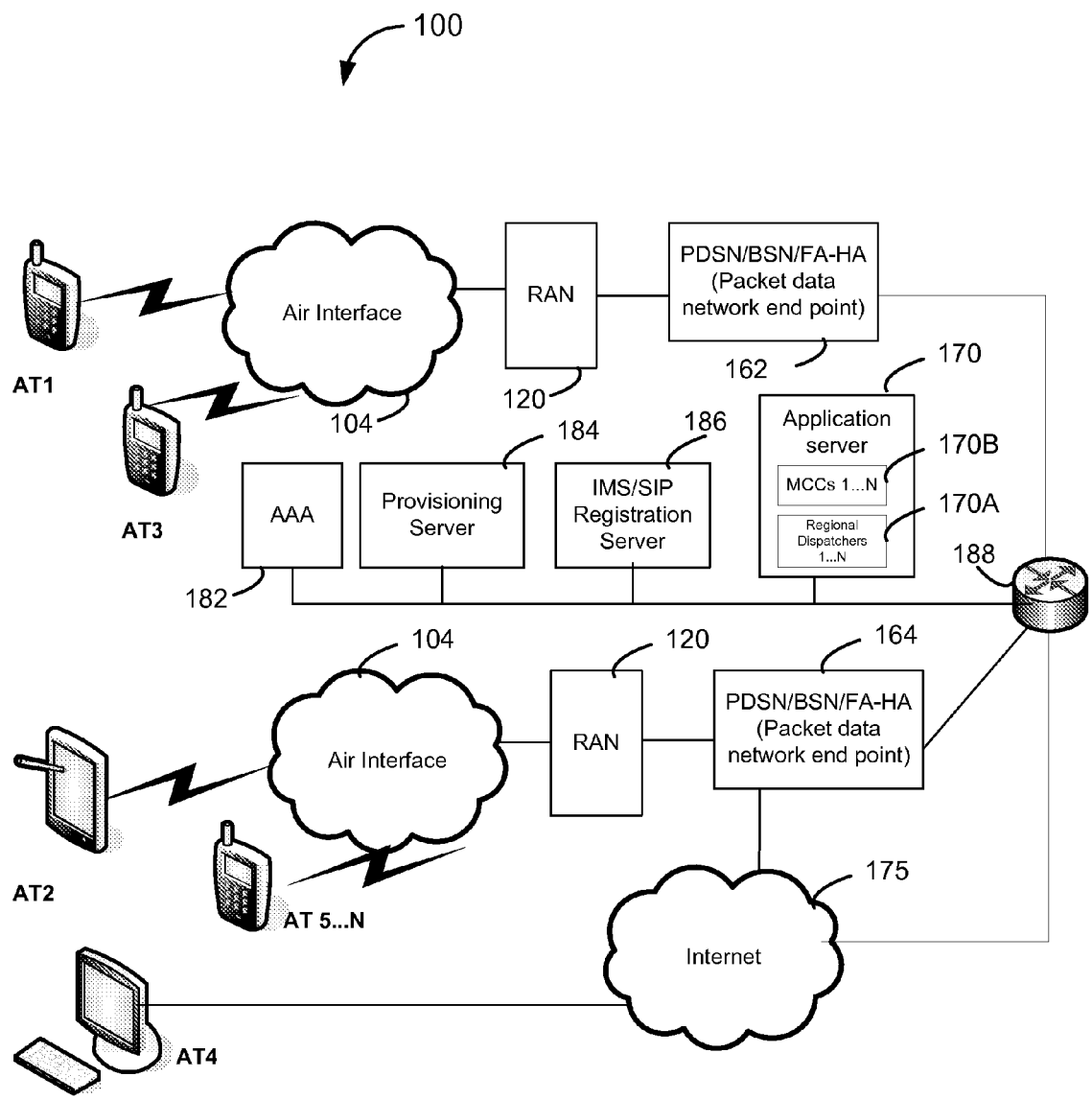
FIG. 2B illustrates an example of the wireless communication 100 of FIG. 1 in more detail.

FIG. 2B illustrates an example of the wireless communication 100 of FIG. 1 in more detail. In particular, referring to FIG. 2B, ATs 1 . . . N are shown as connecting to the RAN 120 at locations serviced by different packet data network end-points. Accordingly, ATs 1 and 3 connect to the RAN 120 at a portion served by a first packet data network end-point 162 (e.g., which may correspond to PDSN 160, BSN 165, a home agent (HA), a foreign agent (FA), etc.). The first packet data network end-point 162 in turn connects, via the routing unit 188, to the Internet 175 and/or to one or more of an authentication, authorization and accounting (AAA) server 182, a provisioning server 184, an Internet Protocol (IP) Multimedia Subsystem (IMS)/Session Initiation Protocol (SIP) Registration Server 186 and/or the application server 170. ATs 2 and 5 . . . N connect to the RAN 120 at a portion served by a second packet data network end-point 164 (e.g., which may correspond to PDSN 160, BSN 165, FA, HA, etc.). Similar to the first packet data network end-point 162, the second packet data network end-point 164 in turn connects, via the routing unit 188, to the Internet 175 and/or to one or more of the AAA server 182, a provisioning server 184, an IMS/SIP Registration Server 186 and/or the application server 170. AT 4 connects directly to the Internet 175, and through the Internet 175 can then connect to any of the system components described above.

Referring to FIG. 2B, ATs 1, 3 and 5 . . . N are illustrated as wireless cell-phones, AT 2 is illustrated as a wireless tablet-PC and AT 4 is illustrated as a wired desktop station. However, in other embodiments, it will be appreciated that the wireless communication system 100 can connect to any type of AT, and the examples illustrated in FIG. 2B are not intended to limit the types of ATs that may be implemented within the system. Also, while the AAA 182, the provisioning server 184, the IMS/SIP registration server 186 and the application server 170 are each illustrated as structurally separate servers, one or more of these servers may be consolidated in at least one embodiment of the invention.

Further, referring to FIG. 2B, the application server 170 is illustrated as including a plurality of media control complexes (MCCs) 1 . . . N 170B, and a plurality of regional dispatchers 1 . . . N 170A. Collectively, the regional dispatchers 170A and MCCs 170B are included within the application server 170, which in at least one embodiment can correspond to a distributed network of servers that collectively functions to arbitrate communication sessions (e.g., half-duplex group communication sessions via IP unicasting and/or IP multicasting protocols) within the wireless communication system 100. For example, because the communication sessions arbitrated by the application server 170 can theoretically take place between ATs located anywhere within the system 100, multiple regional dispatchers 170A and MCCs are distributed to reduce latency for the arbitrated communication sessions (e.g., so that a MCC in North America is not relaying media back-and-forth between session participants located in China). Thus, when reference is made to the application server 170, it will be appreciated that the associated functionality can be enforced by one or more of the regional dispatchers 170A and/or one or more of the MCCs 170B. The regional dispatchers 170A are generally responsible for any functionality related to establishing a communication session (e.g., handling signaling messages between the ATs, scheduling and/or sending announce messages, etc.), whereas the MCCs 170B are responsible for hosting the communication session for the duration of the call instance, including conducting an in-call signaling and an actual exchange of media during an arbitrated communication session.

Figure 3:
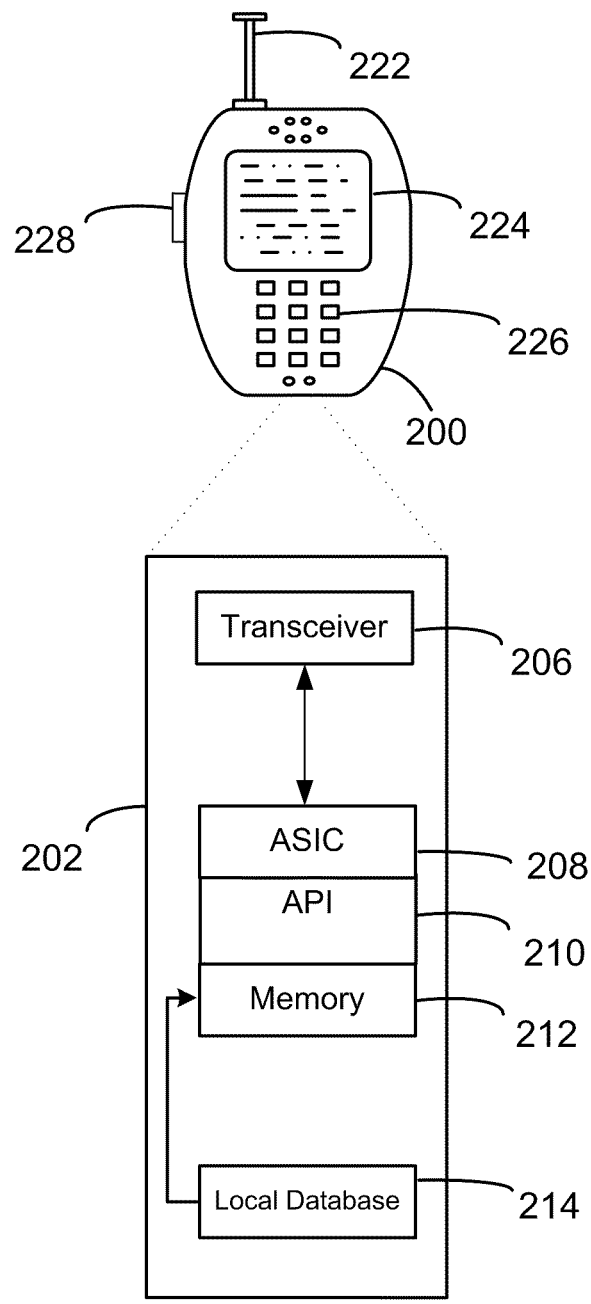
FIG. 3 is an illustration of an access terminal in accordance with at least one embodiment of the invention.

Referring to FIG. 3, an access terminal 200, (here a wireless device), such as a cellular telephone, has a platform 202 that can receive and execute software applications, data and/or commands transmitted from the RAN 120 that may ultimately come from the carrier network 126, the Internet and/or other remote servers and networks. The platform 202 can include a transceiver 206 operably coupled to an application specific integrated circuit ("ASIC" 208), or other processor, microprocessor, logic circuit, or other data processing device. The ASIC 208 or other processor executes the application programming interface ("API") 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include an access terminal including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the access terminal in FIG. 3 are to be considered merely illustrative and the invention is not limited to the illustrated features or arrangement.

The wireless communication between the access terminal 102 and the RAN 120 can be based on different technologies, such as code division multiple access (CDMA), WCDMA, time division multiple access (TDMA), frequency division multiple access (FDMA), Orthogonal Frequency Division Multiplexing (OFDM), the Global System for Mobile Communications (GSM), or other protocols that may be used in a wireless communications network or a data communications network. The data communication is typically between the client device 102, MPT/BS 124, and BSC/PCF 122. The BSC/PCF 122 can be connected to multiple data networks such as the carrier network 126, PSTN, the Internet, a virtual private network, and the like, thus allowing the access terminal 102 access to a broader communication network. As discussed in the foregoing and known in the art, voice transmission and/or data can be transmitted to the access terminals from the RAN using a variety of networks and configurations. Accordingly, the illustrations provided herein are not intended to limit the embodiments of the invention and are merely to aid in the description of aspects of embodiments of the invention.

In a conventional server-arbitrated communication session (e.g., via half-duplex protocols, full-duplex protocols, VoIP, a group session over IP unicast, a group session over IP multicast, a push-to-talk (PTT) session, a push-to-transfer (PTX) session, etc.), the application server 170, which is responsible for arbitrating the communication session, receives a request to initiate a communication session and attempts to find a host-computer (e.g., MCC 170B) with sufficient available resources to host the exchange of media for the communication session. If a host-computer due to resource unavailability, the communication session cannot be set-up. Also, even if a suitable host-computer is selected, and an announce session for announcing the communication session to at least one target (e.g., a single target for a direct call, or multiple targets for a group call) is transmitted, there is no guarantee that the target will actually accept the call. For example, the least one target can be configured to auto-reject the call if the at least one target is already engaged in another communication session. Alternatively, even if the at least one target does not auto-reject the call, a user of the at least one target may simply choose to ignore the announced communication session. As will be appreciated by one of ordinary skill in the art, the uncertainty regarding session-resource availability and target-acceptance can make setting-up a high-priority (e.g., emergency) call difficult to accomplish.

Figure 4:
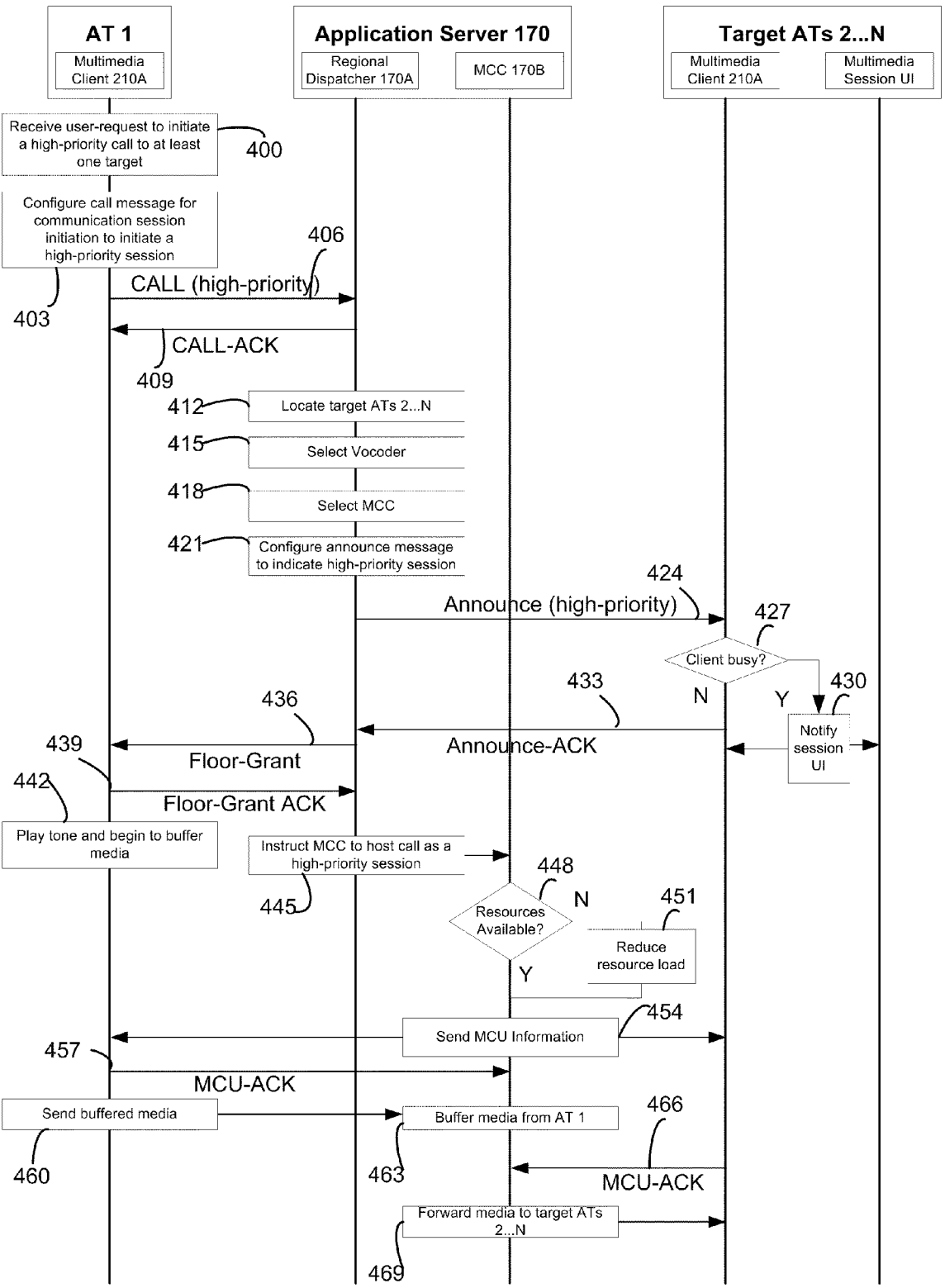
FIG. 4 illustrates a server-arbitrated high-priority communication session set-up process in accordance with an embodiment of the invention.

Accordingly, embodiments of the invention are directed to setting-up and conducting a high-priority (e.g., emergency) server-arbitrated communication sessions within the wireless communications system 100. FIG. 4 illustrates a server-arbitrated high-priority communication session set-up process in accordance with an embodiment of the invention. The high-priority communication session established in FIG. 4 may correspond to any type of server-arbitrated session, including but not limited to a full-duplex VoIP session, a half-duplex group session (e.g., push-to-talk (PTT) or push-to-transfer (PTX)) supported either via IP unicasting such that the RAN 120 is instructed to transmit the forwarded media on a downlink dedicated channel to separately to each target AT, or via IP multicasting protocols such that the RAN 120 is instructed to transmit the forwarded media on a downlink shared channel in at least one sector of the wireless communications system 100 potentially to multiple target ATs within the at least one sector at the same time) wherein a single group-member holds the floor at any given time, a full-duplex group session, a hybrid-duplex or fast full-duplex group session wherein more than one group-member and less than all group-members can simultaneously talk and listen at any given time.

Referring to FIG. 4, the operations performed at AT 1 are performed at a multimedia client 210A, where the multimedia client 210A corresponds to an API among APIs 210 as described with respect to AT 200 of FIG. 3. The multimedia client 210A is responsible for managing multimedia communication sessions at AT 1.

Accordingly, referring to FIG. 4, assume that the multimedia client 210A of AT 1 receives user-input that indicates the user of AT 1 wishes to initiate a high-priority communication session, 400. For example, the user-input received in 400 may correspond to the user pressing a dedicated physical button or soft-key for making high-priority calls. In an alternative example, the user-input received in 400 may correspond to the user requesting a session to a target AT known, by the multimedia client 210A, to be associated with emergencies (e.g., 911, a fire-department's phone number, etc.). In another alternative example, the user-input received in 400 may correspond to the user requesting a normal-priority or non-emergency call along with a secondary indication or input that specifies that the call should be placed as high-priority and/or an emergency. For example, the secondary indication may correspond to the user double-tapping the call-button when placing the high-priority call, holding the call-button or send-button for more than a threshold period of time (e.g., 3 seconds) when placing the call, holding the call-button and another button at the same time when the call is placed, selecting a high-priority and/or an emergency-option from a pull-down menu or other menu in a call set-up screen on the display of AT 1, speaking the words "high-priority" and/or the word "emergency" or some other high-priority-indicating word while voice-dialing, and/or any combination thereof.

After determining that a session to be initiated by AT 1 is intended to be a high-priority session in 400, the multimedia client 210A of AT 1 configures a call message to request initiation of a high-priority communication session, 403. For example, the configuration of 403 may correspond to generating a standard call message to the selected target(s) and then modifying one or more fields of the standard call message to convey, to the application server 170, that AT 1 is attempting to initiate a high-priority communication session. In an example, the field may indicate a highest of a plurality of priority levels, with the highest priority level corresponding to an emergency priority level. In another example, the field may be binary, such that a first field setting corresponds to a high-priority or emergency call and a second field setting corresponds to a regular-priority or non-emergency call. For example, the modified field of the call message may correspond to a Diffsery Code Point (DSCP) value in a header portion of the call message. Alternatively, as discussed above, it is possible that the identification of one or more of the selected target(s) for the communication session are sufficient to inform the application server 170 of the session's high-priority status (e.g., 911, a fire-department's phone number, etc.). In this case, the multimedia client 210A need not additionally modify the call message if the target selection, by itself, is sufficient to convey the high-priority status.

After the configuration of 403, AT 1 transmits the configured call message to the RAN 120 (not shown in this figure), which then forwards the configured call message to a given regional dispatcher 170A of the application server 170, 406. The application server 170 acknowledges receipt of the call message by transmitting an ACK message back to AT 1, 409. The regional dispatcher 170A evaluates the call message and determines that the call is a high-priority call (e.g., by checking the DSCP value in the header of the call-packet), and then locates each of target ATs 2 . . . N (e.g., the regional dispatcher 170A determines if the target ATs are registered with the application server 170, and if so, obtains their respective IP addresses, also, e.g., for a group communication session, N>=2, and for a non-group session such as a VoIP full-duplex one-to-one session, N=2), 412, selects a vocoder for the high-priority communication session, 415 and selects one of the plurality of MCCs 170B to handle or host the high-priority communication session, 418. The regional dispatcher 170A then generates an announce message to announce the high-priority communication session to the target ATs 2 . . . N, and configures the announce message to indicate, to the target ATs 2 . . . N, that the communication session is a high-priority communication session, 421. In an example, similar to the configured call message from 403, the announce message can be configured to include a field that indicates a highest of a plurality of priority levels, with the highest priority level corresponding to an emergency priority level, and/or a binary field such that a first field setting corresponds to a high-priority or emergency call and a second field setting corresponds to a regular priority or non-emergency call. As described above with respect to the call message, the field used to convey high-priority status may correspond to the DSCP field in a header portion of the announce message. The regional dispatcher 170A then forwards the configured announce message to the RAN 120 (not shown in this figure) for transmission to ATs 2 . . . N, 424.

Next, assume that target ATs 2 . . . N receive the configured announce message from 424. In 427, each of target ATs 2 . . . N determine that the announce message is announcing a high-priority session, and further determine whether its respective multimedia client 210A is busy (e.g., engaged in another session). If the multimedia client 210A of the target ATs 2 . . . N determine the multimedia client 210A is not busy in 427, each of target ATs 210 auto-accept the announced high-priority session by sending an announce ACK (accept) message to the application server 170, 433. Otherwise, if the multimedia client 210A of the target ATs 2 . . . N determines the multimedia client 210A is busy in 427, the multimedia client 210A notifies a multimedia user-interface (UI) that a high-priority session has been announced, and then auto-accepts the announced high-priority session by sending an announce ACK (accept) message to the application server 170, 433. In an example, the notification of 430 may correspond to a user-notification that the user's current session will be cut off within a threshold period of time (e.g., 1 second, 3 seconds, etc.) so that the user at least has the opportunity to say 'goodbye' to one or more other parties of the user's current session. Alternatively, in another example, the notification may notify the user of the target ATs 2 . . . N that the user's current session is going to be cut off and transferred to a high-priority call, but does not actually permit the user of the target ATs 2 . . . N time to send any additional media related to the user's current session.

While FIG. 4 illustrates each of target ATs 2 . . . N auto-accepting the announced high-priority communication session irrespective of whether the respective target is already engaged in a communication session, it will be appreciated that a different call-join policy can be implemented if the targets ATs 2 . . . N are engaged in another high-priority session. In this case, the users of target ATs 2 . . . N may not necessarily want to preempt a current high-priority session for another high-priority session. For example, if a doctor is in the middle of providing instructions over-the-phone related to a remote medical procedure in a first high-priority session, it may be counter-productive to transfer the doctor automatically to another emergency for which that the doctor may not necessarily be able to offer assistance. Accordingly, in the case that one or more of the target ATs 2 . . . N is engaged in another high-priority communication session, the user(s) of respective target AT(s) may be given the option with regard to whether to accept the announced high-priority session in at least one embodiment (e.g., instead of simply auto-accepting the new high-priority session and disconnecting from the old high-priority session).

Upon receiving the announce ACK (accept) message from a first of ATs 2 . . . N ("first responder"), the regional dispatcher 170A sends a floor-grant message at least to AT 1, 436, to prompt a user of AT 1 to begin buffering media for eventual transmission to the application server 170 for forwarding to the target ATs 2 . . . N. As will be appreciated, if the high-priority communication session is established as a full-duplex session, the target ATs 2 . . . N are also given the opportunity to forward media to the other call participant(s).

AT 1 receives the floor-grant message from the regional dispatcher 170A and acknowledges receipt of the floor-grant message with an ACK message, 439. The multimedia client 210A then instructs AT 1 to play a tone to inform a user of AT 1 to begin inputting media (e.g., voice data), and the multimedia client 210A buffers the media input by the user of AT 1, 442. Upon receiving the floor-grant ACK from AT 1, the regional dispatcher 170A instructs the MCC 170B selected in 445 to begin hosting the communication session as a high-priority session, 445.

In 448, the selected MCC 170B determines whether it has sufficient call-resources available to support the high-priority communication session, 448. If the MCC 170B determines that sufficient resources are not available in 448, the MCC 170B selectively reduces its current call-resource load in 451. For example, the call-resource load reduction may correspond to dropping one or more currently active calls and/or one or more current call-participants supported by the MCC 170B.

The MCC 170B can select the call-resources for load reduction in 451 in a number of different ways. For example, the MCC 170B can evaluate a level of call-resources expected to be necessary to support the high-priority communication session, and can then drop calls in an order of lowest-priority to highest-priority until the MCC 170B has freed a sufficient level of call-resources to support the high-priority communication session. The priority allocations of the calls, or the order by which the MCC 170B will selective drop calls, can be determined in different ways. For example, other high-priority communication sessions already hosted by the MCC 170B may be allocated a highest-possible priority ranking, calls that have been taking place for more than a threshold period of time may be allocated a lower-priority than comparable calls of shorter-duration. In an alternative example, calls involving large groups of ATs may be allocated a lower priority than small-group calls or one-to-one calls because more call-resources can be acquired through the sacrifice of a single call. In other examples, the priority-ranking may be established such that a lowest number of calls are dropped, or such that a lowest number of call participants are dropped. As will be appreciated, the above-noted priority rankings are only examples, and there are many different ways by which the MCC 170B can drop currently allocated call-resources in order to reserve a given level of call-resources for the high-priority communication session.

After the MCC 170B either (i) determines a sufficient level of call-resources to be available for the high-priority communication session in 448 or (ii) reduces a current call-resource allocation such that the sufficient level of call-resources is obtained, the MCC 170B then sends media control unit (MCU) information to call originator (and current floor-holder) AT 1 as well as target ATs 2 . . . N, 560. The MCU is a software process or instance that handles a single instance for a call or communication session, and the MCU information corresponds to a contact message and includes the IP address and port number regarding where floor-holders are to forward media for re-transmission to other session participant(s) during the high-priority communication session (e.g., as in 460 below), or signaling messages such as ACKs (e.g., as in 457 and/or 466 below).

AT 1 receives the MCU information from the MCC 170B, and acknowledges receipt of the MCU information with an ACK message, 457. Also, upon receiving the MCU information from the MCC 170B, the multimedia client 210A begins transmitting the buffered media to the MCC 170B, 460, which in turn buffers the media forwarded from AT 1, 463. Next, the MCC 170B waits to receive at least one ACK from target ATs 2 . . . N to the MCU information transmitted in 454. In an example, the MCC 170B can wait for a first MCU-information ACK from any of target ATs 2 . . . N and can then begin forwarding the buffered media. In alternative example, the MCC 170B can wait for MCU-information ACKs from a given percentage of target ATs 2 . . . N (e.g., of each target to which the announce message was sent in 424, or of each target that accepted the call in 433) before forwarding any of the buffered media. In another alternative example, the MCC 170B can wait for MCU-information ACKs from each of target ATs 2 . . . N e.g., of each target to which the announce message was sent in 424, or of each target that accepted the call in 433), such that the given percentage equals 100%, before forwarding any of the buffered media (e.g., if it is important for each target AT to receive the full media-flow). In any case, one or more ACKs from target ATs 2 . . . N are received at the MCC 170B in 466. When the number of MCU-information ACKs from the target ATs 2 . . . N satisfies a given threshold (e.g., a first MCU-information ACK is received, a MCU-information ACK is received from each target AT to have accepted the call in 433, a given percentage of target ATs 2 . . . N that accepted the call in 433, etc.), the MCC 170B forwards the buffered media to target ATs 2 . . . N, 469. Also, while the MCU-ACKs are illustrated as arriving at the MCC 170B in 466, if a sufficient number of MCU-ACKs (e.g., one) from target ATs 2 . . . N arrive at the MCC 170B before media begins arriving from AT 1, it will be appreciated that the buffering of block 463 can be skipped and the MCC 170B can begin forwarding the media from AT1 to ATs 2 . . . N as soon as it is received.

While not shown in FIG. 4, if the high-priority communication session is established as full-duplex or hybrid-duplex, one or more of target ATs 2 . . . N can also send media to the application to be forwarded to the call originator AT 1 and/or to other session participants. Accordingly, if the high-priority communication session in FIG. 4 is established as a full-duplex communication session involving two call parties (e.g., a VoIP session) or a full-duplex group communication session involving three or more call parties (e.g., a group PTT call), it will be appreciated that each call participant (e.g., including the call originator) has a traffic channel (TCH) by which to send media to the RAN 120 that is forwarded to the application server 170 for re-transmission to at least one other call participant. Accordingly, in a full-duplex session arbitrated by the application server 170, each call participant can send media (e.g., voice data or other audio data) and each call participant receives either (i) the media from the other party for a full-duplex communication session involving two call parties, or (ii) a mixed version of media from each other party (minus its own media) for a group full-duplex communication session including three or more parties. Thus, if ATs 1 and 2 are conducting a full-duplex call, AT 1 receives AT 2's media and AT 2 receives AT 1's media. If ATs 1, 2 and 3 are conducting a full-duplex group call, AT 1 receives a mixed version of AT 2 and AT 3's media ("AT 2+3 media"), AT 2 receives a mixed version of AT 1 and AT 3's media ("AT 1+3 media") and AT 3 receives a mixed version of AT 1 and AT 2's media ("AT 1+2 media").

Alternatively, it is possible that if the high-priority communication session in FIG. 4 is established as a half-duplex communication session, AT 1 can begin the high-priority communication session as a sole floor-holder speaking to at least one target AT, while the at least one target AT does not have its own TCH for transmitting media to be sent back to the call originator. Normally, in a half-duplex communication session, when a target AT wants to send media to one or more other call participants, the target AT requests the floor and speaks once the floor is granted, with only one call participant holding the floor at any given time. In a hybrid-duplex communication session, more than one floor-holder may have permission to speak.

Figure 5A:
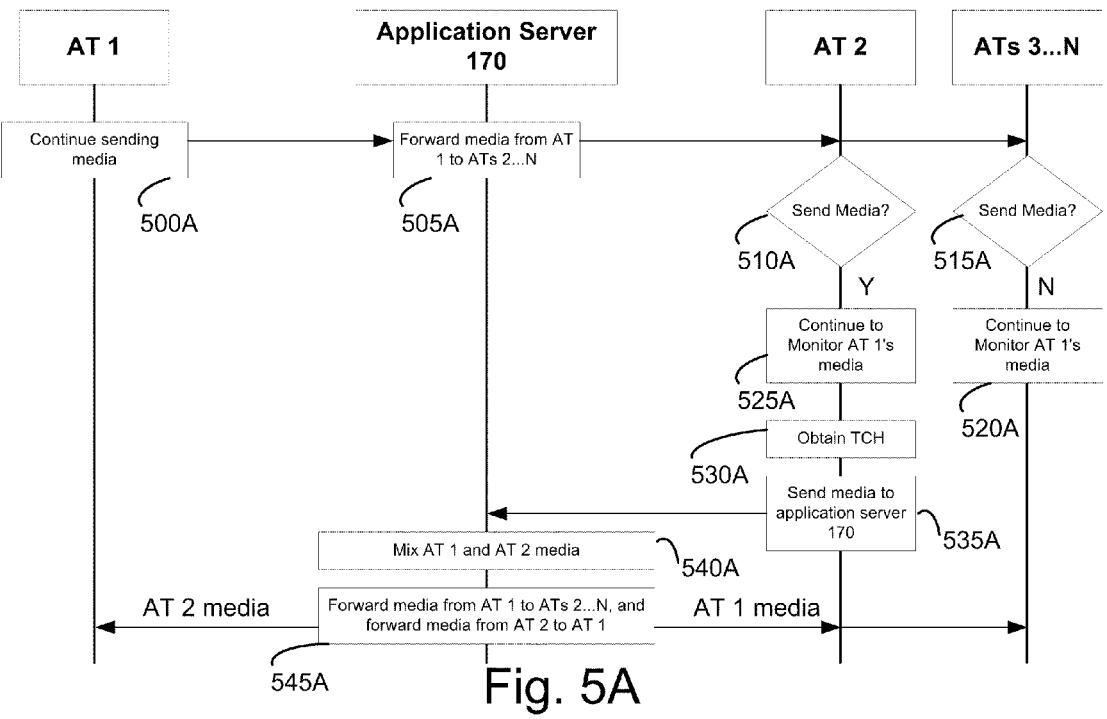
FIGS. 5A and 5B illustrate alternative processes by which a target access terminal participating in the server-arbitrated high-priority communication session of FIG. 4 can send media in accordance with embodiments of the invention
Figure 5B:
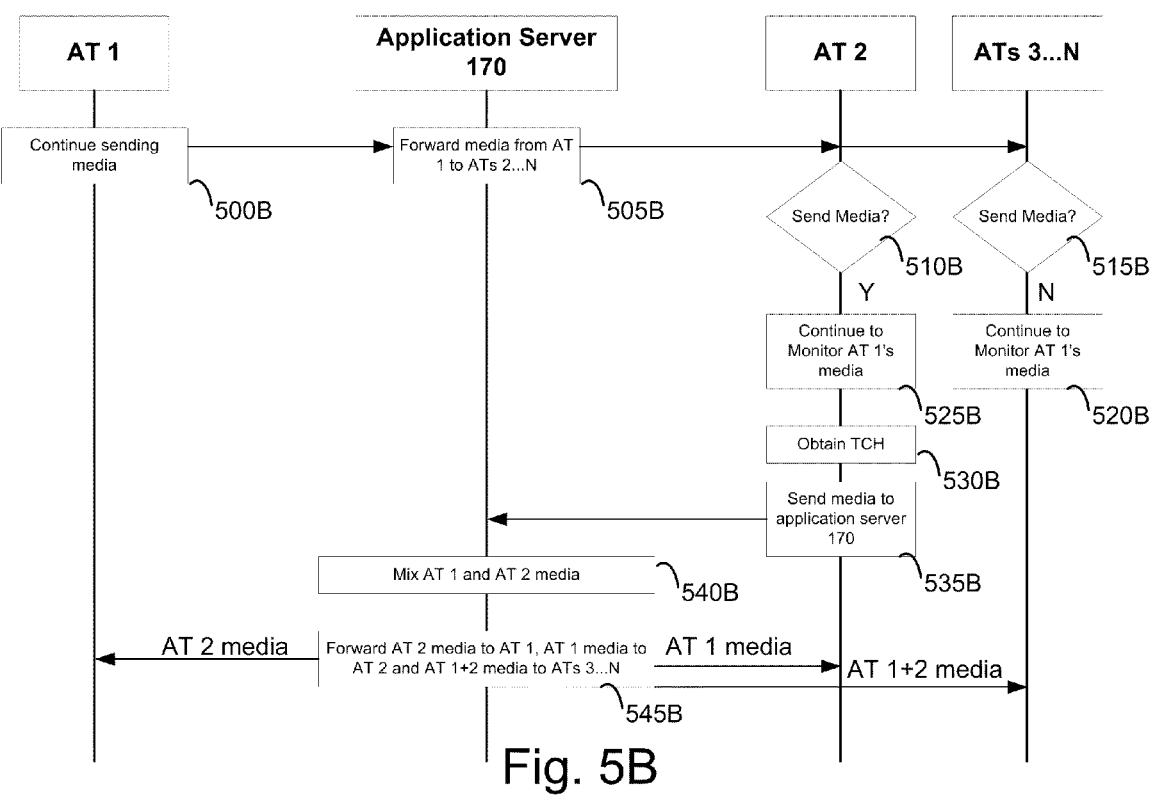

In the case of a high-priority communication session, it can sometimes be undesirable to have the floor transferred away from the call originator. For example, the nature of the emergency can change during the duration of the high-priority communication session, and an emergency responder will be unaware of this change unless the communication link from the call originator is kept open. At the same time, it can also be important for emergency responders to send information back to the call originator and/or to other emergency responders monitoring the call. Accordingly, FIGS. 5A and 5B illustrate examples of how a given target AT can send media back to a call originator and/or one or more other target ATs during a half-duplex or hybrid-duplex group communication session. While FIG. 5A is described with respect to a group communication session, FIG. 5A can be modified to accommodate a non-group-session that only involves ATs 1 and 2 simply by omitting the blocks directed to ATs 3 . . . N.

Further, the illustrations of FIGS. 5A and 5B and their descriptions have been simplified such that specific reference to the multimedia clients 210A, the regional dispatcher 170A and the MCC 170B has been omitted. Instead, FIGS. 5A and 5B refer simply to ATs 1 . . . N and the application server 170. However, it will be readily apparent how the different components contained within the broader elements referred to in FIGS. 5A and 5B are involved in the processes described below.

Thus, referring to FIG. 5A assume that the process of FIG. 4 has executed and that a high-priority communication session has been established as either (i) a half-duplex group communication session with AT 1 as the floor-holder or (ii) a hybrid-duplex group communication session wherein AT 1 and at least one and less than all of ATs 2 . . . N share the floor. Thus, AT 1 forwards media (e.g., voice data) to the application server 170, 500A, and the application server 170 forwards AT 1's media to ATs 2 . . . N, 505A. While not illustrated in FIG. 5A explicitly, if the high-priority communication session corresponds to a hybrid-duplex group communication session and none of the floor-holders other than AT 1 are talking, then silence frames can also be forwarded from the other floor-holders in 505A.

In 510A and 515A, ATs 2 . . . N determine whether to send media to AT 1. For convenience of explanation, assume that ATs 3 . . . N determine not to send media in 515A, and ATs 3 . . . N continue to monitor AT 1's media for the high-priority communication session, 520A. Further assume that AT 2 determines to send media back to AT 1 in 510A. AT 2 continues to monitor AT 1's media for the high-priority communication session, 525A, and obtains a TCH (e.g., by sending a ConnectionRequest message to the RAN 120 and receiving a TCH assignment), 530A. It will be appreciated that AT 2 may already have obtained the TCH, and if so block 530A can be skipped at this point.

AT 2 then sends media over a reverse link of the TCH (R-TCH) to the RAN 120 to be forwarded to the application server 170, 535A. If the high-priority communication session was initially a hybrid-duplex group communication session with both ATs 1 and 2 granted the floor, it will be appreciated that AT 2 can simply send the media to the application server 170 at this point because AT 2 already shares the floor. Otherwise, if the high-priority communication session was initially a hybrid-duplex group communication session and AT 2 did not share the floor or the high-priority communication session was initially a half-duplex group communication session with only AT 1 having the floor, AT 2 may first request the floor from the application server 170 before sending media in 535A. In this case, the application server 170 may elect to maintain AT 1's floor while also grant the floor to AT 2, such that the resultant communication session either remains hybrid-duplex or transitions to hybrid-duplex from half-duplex. In any case, once AT 2 obtains the floor, AT 2 begins transferring media to the application server 170 for transmission to AT 1, 535A. The decision with regard to whether to transition an initial half-duplex communication session into a hybrid-duplex communication session can be made by one of the targets (e.g., a target can request to talk also and the rest of the group including the originator will receive the media from the requesting target).

The application server 170 mixes the input streams of the media from AT 1 and AT 2, 540A. In the example of FIG. 5A, assume that the mixing of 540A establishes an output stream such that AT 1 receives media frames from AT 2, and ATs 2 . . . N each receive media frames from AT 1. Accordingly, the media frames from AT 1 are forwarded to ATs 2 . . . N, and the media frames from AT 2 are forwarded to AT 1, 545A.

However, the mixing of 540A can be performed in a different manner, as illustrated in FIG. 5B. In FIG. 5B, 500B through 535B correspond to 500A through 535A of FIG. A, respectively, and as such a further description of 500B through 535B has been omitted for the sake of brevity.

In 540B, the application server 170 mixes the media streams or frames from ATs 1 and B such that AT 1 receives AT 2's media frames, AT 2 receives AT 1's media frames and ATs 3 . . . N each receive a mixed version of media frames from ATs 1 and 2. Mixing media frames is well-known in the art, and as such will not be described further for the sake of brevity (e.g., the mixing of 540B is similar in some respects to mixing that occurs in full-duplex, except the mixing of 540B is limited to media frames from ATs 1 and 2 instead of involving media frames from all of ATs 1 . . . N). Accordingly, in 545B, the media frames from AT 1 are forwarded to AT 2, the media frames from AT 2 are forwarded to AT 1, and a mixed version of the media frames from ATs 1 and 2 are forwarded to ATs 3 . . . N.

Accordingly, as will be appreciated with respect to FIGS. 5A and 5B, it is possible to maintain AT 1 a floor-holder while also permitting one or more other target ATs to send media either to the whole group or back to AT 1 separately.

It will be appreciated that the above-described high-priority communication sessions can be implemented via IP-multicasting protocols and/or IP-unicasting protocols. For example, the media transmitted by the application server 170 at 469 of FIG. 4 can be sent to the target ATs 2 . . . N individually via IP unicast. In another example, the media transmitted by the application server 170 can be sent to the RAN 120 via IP multicast for transmission to ATs 2 . . . N, such that two or more of ATs 2 . . . N can potentially be tuned to the same downlink multicast channel in the same sector for receiving the media from AT 1.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., access terminal). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of supporting a high-priority communication session at an application server configured to arbitrate the high-priority communication session within a wireless communications system, comprising:
   receiving a request, from a call originator at the application server, to initiate a given communication session with at least one call target, the received request configured to indicate to the application server that the given communication session is associated with a high-priority;
   configuring a call announcement to force the at least one call target to accept the given communication session by modifying one or more fields of the call announcement that do not identify the call originator; and
   transmitting the configured call announcement to the at least one call target.

2. The method of claim 1, further comprising:
   receiving at least one acknowledgment to the configured call announcement from the at least one call target that indicates that the at least one call target has accepted the given communication session.

3. The method of claim 2, further comprising:
   upon receiving the at least one acknowledgment, granting a floor for the given communication session to the call originator.

4. A method of supporting a high-priority communication session at an application server configured to arbitrate the high-priority communication session within a wireless communications system, comprising:
   receiving a request, from a call originator at the application server, to initiate a given communication session with at least one call target, the received request configured to indicate to the application server that the given communication session is associated with a high-priority;
   configuring a call announcement to force the at least one call target to accept the given communication session;
   transmitting the configured call announcement to the at least one call target;
   determining, at the application server, that sufficient resources for supporting the given communication session are not available; and
   selectively reducing a resource load at the application server to make the sufficient resources available for supporting the given communication session.

5. The method of claim 4, wherein the selectively reducing step is performed based on the given communication session being associated with the high-priority.

6. The method of claim 4, wherein the selectively reducing step includes dropping one or more other currently active communication sessions and/or one or more current call-participants participating in the one or more other currently active communication sessions.

7. The method of claim 4, further comprising:
after the selectively reducing step, supporting the given communication session by exchanging media between the call originator and the at least one call target.

8. The method of claim 1, further comprising:
setting up the given communication session as a half-duplex communication session with the call originator as an initial floor-holder;
during the given communication session, receiving media from a given call participant other than a current floor-holder of the half-duplex communication session; and
sending the media received from the given call participant at least to the current floor-holder.

9. The method of claim 8, wherein the given communication session includes the given call participant, the current floor-holder and at least one additional call participant.

10. The method of claim 9, wherein the sending step sends the media from the given call participant to the current floor-holder and not to the at least one additional call participant.

11. The method of claim 9, wherein the sending step sends the media from the given call participant to the current floor-holder and to the at least one additional call participant.

12. The method of claim 11, further comprising:
mixing media received from the current floor-holder with the media received from the given call participant; and
wherein the sending step sends the mixed media to the at least one additional call participant.

13. The method of claim 8, wherein the sending step sends an unmixed version of media from the current floor-holder to the given call participant.

14. The method of claim 8, wherein the sending step sends an unmixed version of the media from the given call participant to the current floor-holder.

15. A method of participating in a high-priority server-arbitrated communication session within a wireless communications system, comprising:
receiving a call announcement at a given access terminal that announces a given communication session;
determining, based upon a configuration of one or more fields within the call announcement that do not identify a call originator of the given communication session, that the call announcement is configured to force the given access terminal to accept the given communication session; and
responsive to the determination, transmitting an acknowledgment to the call announcement that indicates that the given access terminal has accepted the given communication session.

16. The method of claim 15, wherein the given access terminal is engaged in another communication session when the call announcement for the given communication session is received.

17. The method of claim 16, further comprising: terminating the another communication session responsive to the determination.

18. A method of participating in a high-priority server-arbitrated communication session within a wireless communications system, comprising:
receiving a call announcement at a given access terminal that announces a given communication session;
determining that the call announcement is configured to force the given access terminal to accept the given communication session;
responsive to the determination, transmitting an acknowledgment to the call announcement that indicates that the given access terminal has accepted the given communication session,
wherein the given access terminal is engaged in another communication session when the call announcement for the given communication session is received, further comprising:
notifying a user of the given access terminal that the given communication session is being set-up and that the another communication session is being terminated without giving the user an opportunity to reject the call announcement of the given communication session and/ or to remain a call participant in the another communication session.

19. The method of claim 18, wherein the notification includes a user-notification that the another communication session will be terminated within a threshold period of time.

20. The method of claim 19, wherein the user has an opportunity to send media to one or more call participants associated with the another communication session within the threshold period of time.

21. The method of claim 15, further comprising:
notifying a user of the given access terminal that the given communication session is being set-up without given the user an opportunity to reject the call announcement of the given communication session.

22. The method of claim 19, further comprising:
participating in the given communication session as a half-duplex communication session with a call originator as an initial floor-holder;
during the given communication session while the given access terminal is not a current floor-holder, determining to send media from the given access terminal at least to the current floor-holder; and
sending the media to an application server for transmission at least to the current floor-holder.

23. An application server configured to arbitrate a high-priority communication session within a wireless communications system, comprising:
means for receiving a request, from a call originator, to initiate a given communication session with at least one call target, the received request configured to indicate to the application server that the given communication session is associated with a high-priority;
means for configuring a call announcement to force the at least one call target to accept the given communication session by modifying one or more fields of the call announcement that do not identify the call originator; and
means for transmitting the configured call announcement to the at least one call target.

24. An access terminal configured to participate in a high-priority server-arbitrated communication session within a wireless communications system, comprising:
means for receiving a call announcement that announces a given communication session;
means for determining, based upon a configuration of one or more fields within the call announcement that do not identify a call originator of the given communication session, that the call announcement is configured to force the access terminal to accept the given communication session; and
means for, responsive to the determination, transmitting an acknowledgment to the call announcement that indicates that the access terminal has accepted the given communication session.

25. An application server configured to arbitrate a high-priority communication session within a wireless communications system, comprising:

logic configured to receive a request, from a call originator, to initiate a given communication session with at least one call target, the received request configured to indicate to the application server that the given communication session is associated with a high-priority;

logic configured to configure a call announcement to force the at least one call target to accept the given communication session by modifying one or more fields of the call announcement that do not identify the call originator; and logic configured to transmit the configured call announcement to the at least one call target.

26. An access terminal configured to participate in a high-priority server-arbitrated communication session within a wireless communications system, comprising:

logic configured to receive a call announcement that announces a given communication session;

logic configured to determine, based upon a configuration of one or more fields within the call announcement that do not identify a call originator of the given communication session, that the call announcement is configured to force the access terminal to accept the given communication session; and logic configured to, responsive to the determination, transmit an acknowledgment to the call announcement that indicates that the access terminal has accepted the given communication session.

27. A non-transitory computer-readable storage medium including instructions stored thereon, which, when executed by an application server configured to arbitrate a high-priority communication session within a wireless communications system, cause the application server to perform operations, the instructions comprising:

program code to receive a request, from a call originator, to initiate a given communication session with at least one call target, the received request configured to indicate to the application server that the given communication session is associated with a high-priority;

program code to configure a call announcement to force the at least one call target to accept the given communication session by modifying one or more fields of the call announcement that do not identify the call originator; and program code to transmit the configured call announcement to the at least one call target.

28. A non-transitory computer-readable storage medium including instructions stored thereon, which, when executed by an access terminal configured to participate in a high-priority server-arbitrated communication session within a wireless communications system, cause the access terminal to perform operations, the instructions comprising:

program code to receive a call announcement that announces a given communication session;

program code to determine, based upon a configuration of one or more fields within the call announcement that do not identify a call originator of the given communication session, that the call announcement is configured to force the access terminal to accept the given communication session; and program code to, responsive to the determination, transmit an acknowledgment to the call announcement that indicates that the access terminal has accepted the given communication session.

29. The method of claim 1, wherein the configured call announcement includes an explicit indication of the given communication session's priority level to force the at least one call target to accept the given communication session.

30. The method of claim 1, wherein the one or more fields that do not identify the call originator correspond to:

a session priority field that identifies a highest priority level or emergency priority level for the given communication session.

31. The method of claim 30, wherein the session priority field is a Diffsery Code Point (DSCP) value in a header portion of the configured call announcement.

32. The method of claim 15, wherein the one or more fields that do not identify the call originator correspond to:

a session priority field that identifies a highest priority level or emergency priority level for the given communication session.

33. The method of claim 32, wherein the session priority field is a Diffsery Code Point (DSCP) value in a header portion of the configured call announcement.

* * * * *